United States Patent
Kim et al.

(10) Patent No.: US 8,284,349 B2
(45) Date of Patent: Oct. 9, 2012

(54) BACKLIGHT UNIT AND LIQUID CRYSTAL DISPLAY DEVICE MODULE INCLUDING THE SAME

(75) Inventors: Hyung-Seok Kim, Gumi-si (KR); Young-Su Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 577 days.

(21) Appl. No.: 12/591,554

(22) Filed: Nov. 23, 2009

(65) Prior Publication Data
US 2010/0245704 A1 Sep. 30, 2010

(30) Foreign Application Priority Data
Mar. 30, 2009 (KR) ........................ 10-2009-0027090

(51) Int. Cl.
*G02F 1/1335* (2006.01)
(52) U.S. Cl. ............................................ 349/65; 349/58
(58) Field of Classification Search .................... 349/58, 349/65
See application file for complete search history.

(56) References Cited

U.S. PATENT DOCUMENTS

| 5,063,433 A * | 11/1991 | Matsuo et al. ................ 257/211 |
| 2008/0123335 A1 * | 5/2008 | Yoo et al. ....................... 362/257 |
| 2009/0190061 A1 * | 7/2009 | Lee et al. ........................ 349/58 |

\* cited by examiner

*Primary Examiner* — Eric Wong
(74) *Attorney, Agent, or Firm* — McKenna Long & Aldridge, LLP

(57) ABSTRACT

A backlight unit includes a plurality of light emitting diodes as a light source; a board having a rectangular shape and including a plurality of metal lines each extending along a first direction, wherein the plurality of light emitting diodes are arranged on the board and respectively connected to the plurality of metal lines; a pad portion attached on a side, which is parallel to the first direction, of the board and including first to Nth pads respectively connected to the plurality of metal lines, wherein N is a positive integer; a driving circuit connected to the first to Nth pads and providing a driving signal into the plurality of light emitting diodes; and an optical member at a side of the light emitting diodes and for improving a light property.

20 Claims, 4 Drawing Sheets

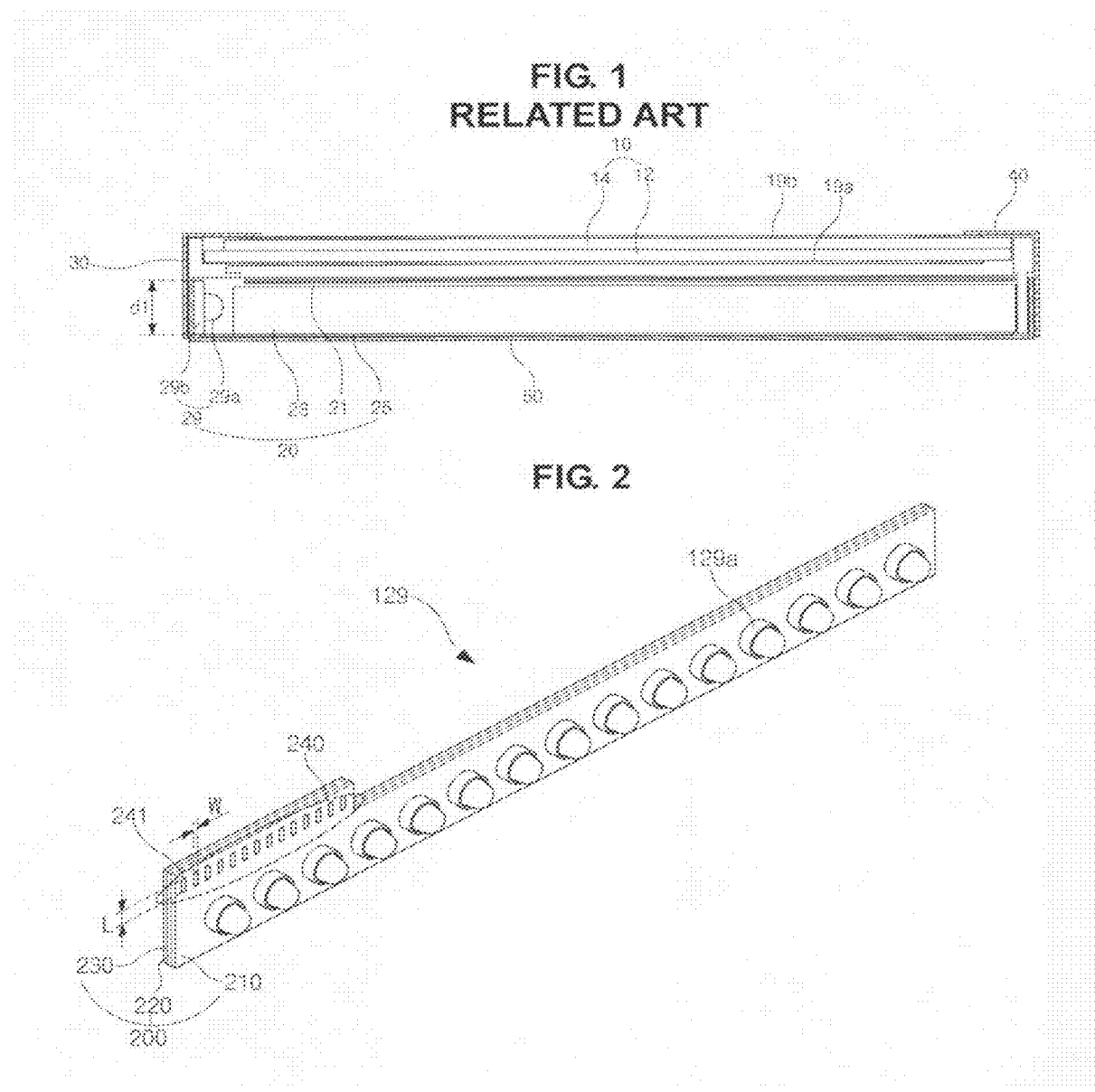

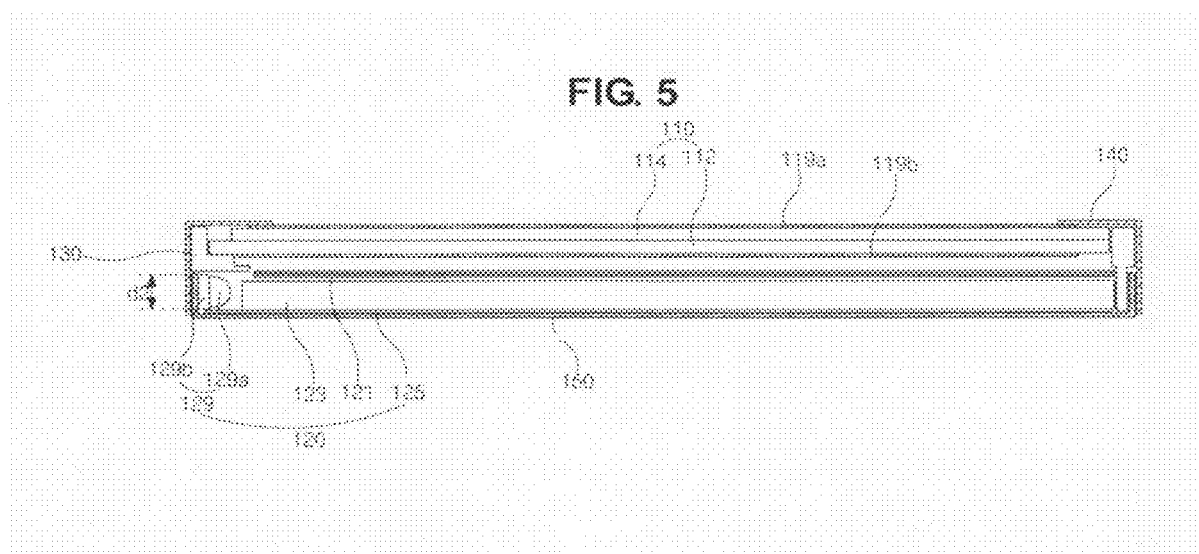

BACKLIGHT UNIT AND LIQUID CRYSTAL DISPLAY DEVICE MODULE INCLUDING THE SAME

The present application claims the benefit of Korean Patent Application No. 10-2009-0027090 filed in Korea on Mar. 30, 2009, which is hereby incorporated by reference for all purposes as if fully set forth herein.

BACKGROUND OF THE INVENTION

1. Field of the Invention

The present invention relates to a backlight unit and a liquid crystal display (LCD) device module and more particularly to a backlight unit including a light emitting diode (LED) assembly having a reduced width, and a liquid crystal display device module including the backlight unit.

2. Discussion of the Related Art

The LCD device, which uses an optical anisotropy and a polarization property to display an image, is widely used for notebook computers, monitors, TV, and so on, because of their high contrast ratio and characteristics adequate to display moving images.

The LCD device includes a liquid crystal panel having a first substrate, a second substrate and a liquid crystal layer. The first and second substrates face each other, and the liquid crystal layer is interposed therebetween. An arrangement of the liquid crystal molecules in the liquid crystal layer is changed by an electric field induced in the liquid crystal panel to control light transmissivity.

Generally, an additional light source is required because the LCD panel is a non-emissive-type display device. Accordingly, a backlight unit is disposed under the LCD panel. The LCD device displays images using light produced by the backlight unit and supplied to the LCD panel.

FIG. 1 is a cross-sectional view of the related art LCD device module. In FIG. 1, the LCD device module includes a liquid crystal panel 10, a backlight unit 20, a main frame 30, a top frame 40 and a bottom frame 50.

The liquid crystal panel 10 includes a first substrate 112, a second substrate 14 and a liquid crystal layer (not shown). The first and second substrates 12 and 14 face each other, and the liquid crystal layer is interposed therebetween. First and second polarization plates 19a and 19b is disposed on opposite sides of the liquid crystal panel 10.

The backlight unit 20 is disposed under the liquid crystal panel 10. The backlight unit 20 includes a light source 29, a reflective sheet 25, a light guide plate 23 and an optical sheet 21. The light source 29 is arranged along at least one side of the main frame 30. The reflective sheet 25 is disposed on the bottom frame 50 and has a color of white or silver. The light guide plate 25 is disposed on the reflective sheet 25, and the optical sheet 21 is disposed on or over the light guide plate 23.

The liquid crystal display panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modulation.

One of a cold cathode fluorescent lamp (CCFL), an external electrode fluorescent lamp and an LED is used as a light source 29 of the backlight unit 20. Among these light source, the LED is widely used because of their characteristics, for example, small size, low power consumption, and so on.

As shown in FIG. 1, the LED 29a is arranged on a printed circuit board (PCB) 29b to form the light source 29. The light source 29 including the LED 29a may be referred to as an LED assembly. The light emitted from at least one LED assembly 29 is provided into the light guide plate 23. The light is processed into a plane light source having an uniform brightness through the light guide plate 23, the reflective sheet 25 and the optical sheet 21, and provided into the liquid crystal panel 10. Power is provided into each LED 29a through a power line (not shown) on the PCB 29b. All LEDs 29a are turned on and off such that white light is obtain by mixing red, green and blue light.

Although not shown, a backlight driving circuit for controlling the LED assembly 29 is disposed on the LCD device module. The backlight driving circuit is bent into a rear surface of the bottom frame 50 to minimize a size of the LCD device module. A pad unit, which is connected to the backlight driving circuit through a cable, may be formed on the PCB 29b such that the LED assemblies 29, which are linked to each other, may be connected to the backlight driving circuit. Since the LEDs 29a in parallel receives power, the number of the pad units on the PCB 29b may be same as the number of the LEDs 29a. As there are more pad units, a width (a vertical thickness in FIG. 1) is increased.

On the other hand, since the LED assembly 29 is vertically positioned at a side of the bottom frame 50, a thickness of the backlight unit 20 is determined by a thickness "d1" of the PCB 29b of the LED assembly 29. Accordingly, as there are more pad units, the LCD device module has an increase thickness.

SUMMARY OF THE INVENTION

Accordingly, the present invention is directed to a backlight unit and an LCD device module including the same that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An object of the present invention is to provide an LED assembly having a reduced width.

Another object of the present invention is to provide an LCD device module having a reduced thickness.

To achieve these and other advantages and in accordance with the purpose of the present invention, as embodied and broadly described herein, a backlight unit includes a plurality of light emitting diodes as a light source; a board having a rectangular shape and including a plurality of metal lines each extending along a first direction, wherein the plurality of light emitting diodes are arranged on the board and respectively connected to the plurality of metal lines; a pad portion attached on a side, which is parallel to the first direction, of the board and including first to Nth pads respectively connected to the plurality of metal lines, wherein N is a positive integer; a driving circuit connected to the first to Nth pads and providing a driving signal into the plurality of light emitting diodes; and an optical member at a side of the light emitting diodes and for improving a light property, wherein the first pad has a larger width and a smaller length than the Nth pad, and wherein the width of each of the first to Nth pads is defined as a distance between opposite sides thereof along the first direction, and the length of the each of the first to Nth pads is defined as a distance between opposite sides thereof along a second direction perpendicular to the first direction.

In another aspect, a liquid crystal display device module includes a liquid crystal panel; a backlight unit for projecting light on the liquid crystal panel, the backlight unit including: a plurality of light emitting diodes as a light source; a board having a rectangular shape and including a plurality of metal lines each extending along a first direction, wherein the plurality of light emitting diodes are arranged on the board and respectively connected to the plurality of metal lines; a pad portion attached on a side, which is parallel to the first direction, of the board and including first to Nth pads respectively connected to the plurality of metal lines, wherein N is a positive integer; a driving circuit connected to the first to Nth pads and providing a driving signal into the plurality of light emitting diodes; and an optical member at a side of the light emitting diodes and for improving a light property, and a bottom frame under the backlight unit, wherein the first pad has a larger width and a smaller length than the Nth pad, and wherein the width of each of the first to Nth pads is defined as a distance between opposite sides along the first direction, and the length of the each of the first to Nth pads is defined as a distance between opposite sides along a second direction perpendicular to the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1 is a cross-sectional view of the related art LCD device module;

FIG. 2 is a schematic perspective view of an LED assembly according to the present invention;

FIG. 5 is a cross-sectional view of an LED device module according to the present invention.

DETAILED DESCRIPTION OF THE EMBODIMENTS

Figure 3A:
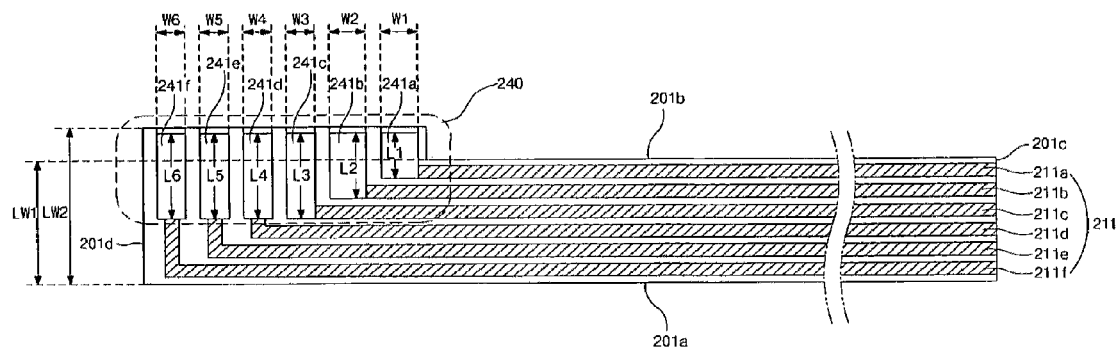
FIGS. 3A and 3B are respectively plan perspective views of a printed circuit board (PCB) for an LED assembly according to embodiments of the present invention.

Reference will now be made in detail to the preferred embodiments, examples of which are illustrated in the accompanying drawings.

FIG. 2 is a schematic perspective view of an LED assembly according to the present invention. In FIG. 2, an LED assembly 129 includes a PCB 200, a plurality of LEDs 129a and a pad portion 240. The LEDs 129a are arranged on the PCB 200 using a surface mount technology (SMT) and spaced apart from each other. One LED 129a emits red light, another one LED 129a emits green light, and the other one LED 129a emits blue light. The LEDs 129a are connected to a power line (not shown) on the PCB 200 in parallel and simultaneously turned on and off such that white light is provided by mixing red, green and blue lights. The pad portion 240 is attached on a side of the PCB 200.

The PCB 200 includes a power line layer 210, an insulating layer 220 and a base layer 230. The base layer 230 may be a metal PCB, which is formed of a metallic material having a high thermal conductivity, for example, aluminum (Al) or copper (Cu). A thermal conductive material may be coated on the metal PCB to further improve a thermal conductive property. A heat from the LEDs 129a is easily radiated in outward due to the base layer 230. A heat radiating plate (not shown), for example, a heat sink, may be formed on a rear side of the base 230 such that it is easy to radiate a heat.

The power line layer 210 is positioned over the base 230. The power line layer 210 includes a plurality of metal lines, for example, a power line, formed by patterning a conductive metal layer. The insulating layer 220 is positioned between the power line layer 210 and the base layer 230 such that the base layer 230 and the power line layer 210 are electrically insulated from each other. The LEDs 129a on the PCB 200 are connected to each other in parallel through the metal lines of the power line layer 210.

The LEDs 129a are controlled by a backlight driving circuit (not shown). The backlight driving circuit is connected to pads 241 on the pad portion 240 through a cable (not shown) such that the LEDs 129a are connected to the backlight driving circuit. Each pad 241 is connected to each metal line on the power line layer 210. One end of the cable is connected to the backlight driving circuit, and the other one end of the cable is connected to the each pad 241. The cable may be connected to the pad 241 by a soldering. A driving signal from the backlight driving circuit is provided into the LEDs 129a through the pads 241 and metal lines.

Figure 3B:
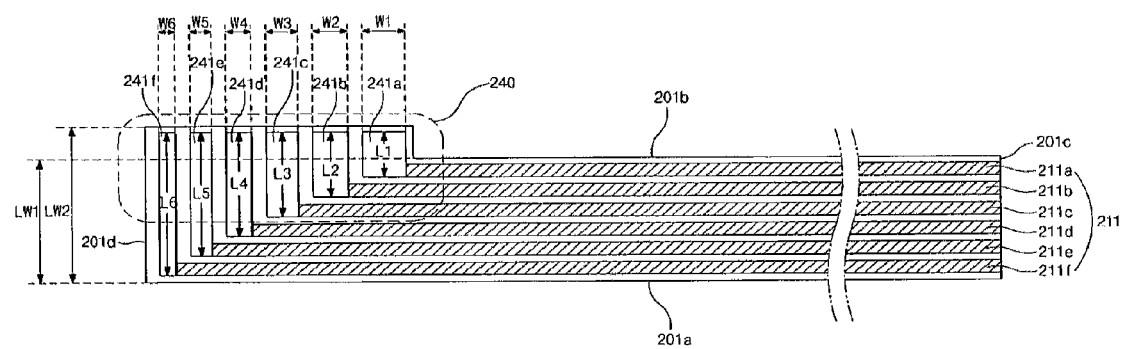

Referring to FIGS. 3A and 3B, which are respectively schematic plan views of a printed circuit board (PCB) for an LED assembly according to embodiments of the present invention, the pads 241 have a difference in a width and a length depending on a position. FIG. 3 shows first to sixth pads 241a to 241f. However, there may be more pads. The PCB 200 (of FIG. 2) has a rectangular bar shape, and the pad portion 240 is attached on a side of the PCB 200. The PCB 200 includes first and second sides 201a and 201b parallel to a first direction and third and fourth sides 201c and 201d parallel to a second direction being perpendicular to the first direction. Each of the first and second sides 201a and 201b are longer than each of the third and fourth sides 201c and 201d. The pad portion 240 is attached on the second and fourth sides 201b and 201d such that the LED assembly 129 (of FIG. 2) has a first width LW1 at one end greater than a second width LW2 at the other end.

The metal lines 211 extend along the first direction. Namely, the metal lines 211 are parallel to each of the first and second sides 201a and 201b. FIG. 3 shows first to sixth metal lines 211a to 211f. Although not shown, first to sixth LEDs are connected to the first to sixth metal lines 211a to 211f, respectively. However, if there are more LEDs, there are also more metal lines and pads. The first to sixth metal lines 211a to 211f are spaced apart from each other by a predetermined distance such that the LEDs are connected to the backlight driving circuit in parallel. Each of the first to sixth metal lines 211a to 211f has a width same as one another and smaller than the smallest width among widths of the first to sixth pads 241a to 241f.

The first to sixth pads 241a to 241f are arranged along the first direction and spaced apart from each other. The first to sixth pads 241a to 241f has first to sixth width W1 to W6 along the first direction and first to sixth lengths L1 to L6 along the second direction. The pads 241a to 241f extend from the pad portion 240 into the PCB 200. The first length L1 of the first pad 241a, which is closet to the third side 201c, is smallest among the first to sixth lengths L1 to L6, and the first width W1 of the first pad 241a is largest among the first to sixth widths among the first to sixth widths W1 to W6. The sixth length L6 of the sixth pad 241f, which is closet to the fourth side 201d, is largest among the first to sixth lengths L1 to L6, and the sixth width W6 is smallest among the first to sixth widths W1 to W6. Namely, as the pad is closer to the third side 201c, the width of the pads is larger. As the pad is closer to the fourth side 201d, the length of the pad is larger. The width and length of the pads are varied depending on their positions. If the first width W1 of the first pad 241a is equal to the width of other pads, for example, the sixth pad 241f, there are problems, for example, a boding strength, in a soldering process for connecting the cable to the pad because the first pad 241a has too small size. However, since the first width W1 of the first pad 241a is larger than other pads, there is no problem in the soldering process. In addition, since the sixth pad W6 has a largest length and smallest width, the sixth pad W6 also has a sufficient bonding strength with the cable.

In FIG. 3A, the third to sixth pads 241c to 241f have the same length and width as one another. The second pad 241b has a width smaller than the first pad 241a and larger than the third to sixth pads 241c to 241f and a length larger than the first pad 241a and smaller than the third to sixth pads 241c and 241f. The first metal line 211a contacts a side, which faces the third side 201c of the PCB, of the first pad 241a. In addition, since the second length L2 of the second pad 241b is larger than the first length L1 of the first pad 241a by a thickness the second metal line 211b and a summation of a distance between adjacent metal lines, i.e., the first and second metal lines 211a and 211b, the second metal line 211b contacts a side, which faces the third side 201c of the PCB, of the second pad 241b. Furthermore, since the third length L3 of the third pad 241c is larger than the second length L2 of the second pad 241b by a summation of a thickness of the third metal line 211c and a distance between adjacent metal lines, i.e., the second and third metal lines 211b and 211c, the third metal line 211c contacts a side, facing the third side 201c of the PCB, of the third pad 241b. On the other hand, since each of the fourth to sixth pads 241d to 241f has the same length as the third pad 241c, the fourth to sixth metal lines 211d to 211f contacts a side, which faces the first side 201a of the PCB, of the fourth to sixth pads 241d to 241f, respectively.

In FIG. 3B, the first to sixth pads 241a to 241f have stepwise increasing lengths and stepwise decreasing widths to obtain an uniform size. The first pad 241a has the first width W1 largest among the first to sixth pads 241a to 241f and the first length L1 smallest among the first to sixth pads 241a to 241f. The sixth pad 241f has the sixth width W6 smallest among the first to sixth pads 241a to 241f and the sixth length L6 largest among the first to sixth pads 241a to 241f. The second to fourth pads 241b to 241e respectively have the second to fifth width W2 to W5, which are stepwise decreased and have a range between the first and sixth widths W1 and W6, and respectively have the second to fifth lengths L2 to L5, which are stepwise increased and have a range between the first and sixth lengths L1 and L6. The first to sixth metal lines 211a to 211f respectively contacts a side, which faces the third side 201c of the PCB, of the first to sixth pads 241a to 241f. Consequently, since a length of an Nth pad is smaller than that of an (N-1)th pad and a width of the Nth pad is larger than that of the (N-1)th pad, each pad has the same bonding area such that a bonding strength of each pad with the cable becomes uniform.

In the present invention, a width of the LED assembly, which is a summation of a width of the PCB 200 and the pad portion 240, is decreased and a bonding area of each pad is sufficient. As a result, the LCD device module has a reduced thickness without problem in a bonding of the cable with the pad on the LED assembly.

Figure 4:
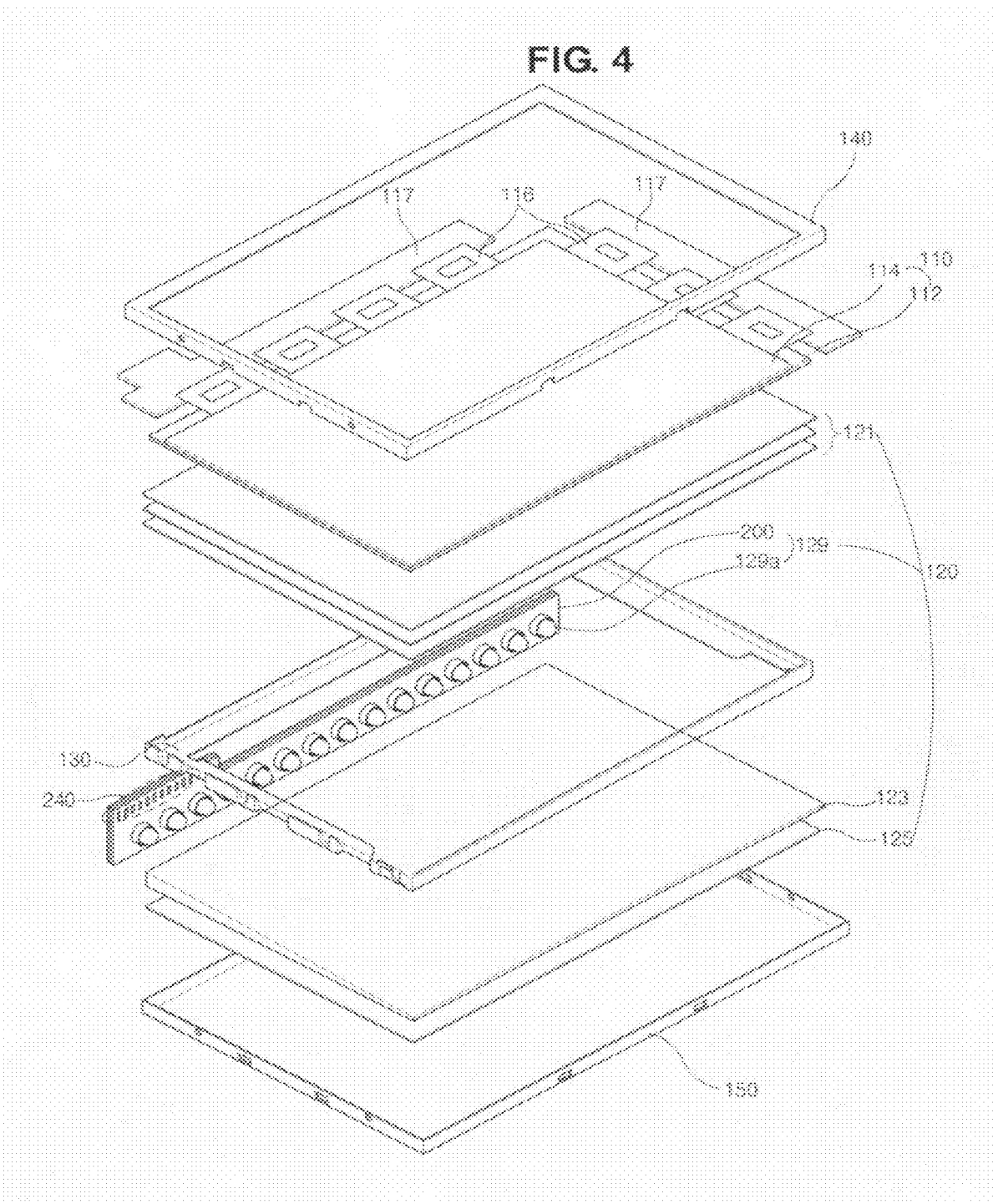
FIG. 4 is an exploded perspective view of an LCD device module according to the present invention.

FIG. 4 is an exploded perspective view of an LCD device module according to the present invention, and FIG. 5 is a cross-sectional view of an LED device module according to the present invention. The LCD device module includes a liquid crystal panel 110, a backlight unit 120, a main frame 130, a top frame 140 and a bottom frame 150.

The liquid crystal panel 110 includes a first substrate 112, a second substrate 114 and a liquid crystal layer (not shown). The first and second substrates 112 and 114 face each other, and the liquid crystal layer is interposed therebetween. First and second polarization plates 119a and 119b is disposed on opposite sides of the liquid crystal panel 110.

When the liquid crystal panel 110 is an active matrix type, a gate line (not shown) and a data line (not shown) are formed on the first substrate 112. The gate and data lines cross each other to define a pixel region. A thin film transistor (TFT) (not shown) is formed at a crossing portion of the gate and data lines. A pixel electrode (not shown) is formed in each pixel region and connected to the TFT. The first substrate 112 may be referred to as an array substrate. On the second substrate 114, a black matrix (not shown) having an opening, which corresponding to the pixel region, is formed. A color filter layer including red, green and blue sub-color filters is formed in the opening. A common electrode is formed on the color filter layer. The second substrate 114 may be referred to as a color filter substrate. The liquid crystal panel 110 is connected to gate and data printed circuit boards (PCBs) 117 through a connection member 116, for example, a flexible circuit board or a tape carrier package, that provide a scanning signal and an image signal to the liquid crystal panel 110, respectively. The printed circuit board 117 extends along end portions of a side surface of the main frame 130 or a rear surface of a bottom frame 150, respectively, as dummy spaces in a modulation process. When the TFT is turned on by a scanning signal form a gate driving circuit, an image signal is applied to the pixel electrode. Then, the liquid crystal layer is driven by an electric field generated between the pixel and common electrodes. As a result, light transmissivity of the liquid crystal layer is controlled such that the LCD device module can produce an image.

The backlight unit 120 for providing light onto the liquid crystal panel 110 is disposed under the liquid crystal panel 110. The backlight unit 120 includes an LED assembly 129 and an optical member for improving a light property. The optical member may include a reflective sheet 125, a light guide plate 123 and an optical sheet 121. The LED assembly 129 is disposed at a side of the light guide plate 125 and includes a plurality of LEDs 129a, a PCB 200, where the LEDs 129a are arranged, and a pad portion 240 including a plurality of pads 241a to 241f (of FIGS. 3A and 3B) for connecting the LEDs 129a to a backlight driving circuit (not shown). The backlight driving circuit may be disposed under the bottom frame 150 to minimize a size of the LCD device module.

Referring to FIGS. 3A and 3B, the metal lines 211a to 211f are formed on the PCB 200 and connected to the pads 241a to 241f on the pad portion 240 such that the LEDs 129a are connected to the backlight driving circuit through the metal lines 211a to 211f, the pads 241a to 241f and the cable (not shown). Particularly, the pads 241a to 241f have a difference in a width and a length depending on their position. Accordingly, the LED assembly 129 has a decreased width W2 such that a thickness of the LCD device module can be minimized. In addition, the pads 241a to 241f have a sufficient area such that a boding strength problem is overcome.

The light from the LED 129a is processed into a plane light source during passing through the light guide plate 123 by a total reflection. The light guide plate 123 may have a pattern for providing an uniform plane light source. The reflective sheet 125 is disposed under the light guide plate 123. The light is reflected on the reflective sheet to improve an optical efficiency. The optical sheet 121 on or over the light guide plate 123 includes a diffusion sheet and at least one concentrating sheet. The light, which passes through the light guide plate 123, is diffused and/or concentrated such that an uniform plane light is provided onto the liquid crystal panel 110.

The liquid crystal display panel 110 and the backlight unit 120 are combined using the main frame 130 that can prevent movement of the liquid crystal panel 110 and the backlight unit 120. The main frame 130 surrounds sides of the liquid crystal panel 110. The top frame 140 covers edges of the liquid crystal panel 10 and sides of the main frame 130, so the top frame 140 can support and protect of the edges of the liquid crystal panel 110 and sides of the main frame 130. The bottom frame 150 covers back edges of the main frame 130, so the bottom frame 150 is combined with the main frame 130 and the top frame 140 for modulation.

As shown in FIG. 5, the LED assembly 129 is vertically disposed at a side of the bottom frame 150. As mentioned above, since the LED assembly 129 has a reduced width d2, i.e., a vertical thickness, a thickness of the LCD device module is also reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
A plurality of light emitting diodes as a light source;
A board having a rectangular shape and including a plurality of metal lines each extending along a first direction, wherein the plurality of light emitting diodes are arranged on the board and respectively connected to the plurality of metal lines;
A pad portion attached to a side, which is parallel to the first direction of the board and including first to Nth pads respectively connected to the plurality of metal lines, wherein N is a positive integer greater than 1;
A driving circuit connected to the first to Nth pads and providing a driving signal into the plurality of light emitting diodes; and
An optical member at a side of the light emitting diodes and for improving a light property,
Wherein the first pad has a larger width and a smaller length than the Nth pad, and
Wherein the width of each of the first to Nth pads is defined as a distance between opposite sides thereof along the first direction, and the length of each of the first to Nth pads is defined as a distance between opposite sides thereof along a second direction perpendicular to the first direction.

2. The backlight unit according to claim 1, wherein the rectangular shape includes first and second sides along the first direction and third and fourth sides along the second direction, and the pad portion is attached on the first side of the rectangular shape.

3. The backlight unit according to claim 2, wherein the first pad, which is closet to the third side of the rectangular shape, has the largest width and the smallest length, and the Nth pad, which is closet to the fourth side of the rectangular shape, has the smallest width and the largest length.

4. The backlight unit according to claim 3, wherein widths of the first to Nth pads are stepwise increased.

5. The backlight unit according to claim 3, wherein lengths of the first to Nth pads are stepwise decreased.

6. The backlight unit according to claim 1, wherein one pad positioned between the first pad and the Nth pad has a width smaller than the first pad and lager than the Nth pad and a length larger than the first pad and smaller than the Nth pad.

7. The backlight unit according to claim 1, wherein one pad positioned between the first pad and the Nth pad has a width equal to or smaller than the first pad and a length equal to or larger than the first pad, and another one positioned between the first pad and the Nth pad has a width equal to or larger than the Nth pad and a length equal to or smaller than the Nth pad.

8. The backlight unit according to claim 1, wherein at least one metal line contacts a side, which extends along a second direction perpendicular to the first direction, of corresponding pads.

9. The backlight unit according to claim 1, wherein all metal lines contacts a side, which extends along a second direction perpendicular to the first direction, of corresponding pads.

10. The backlight unit according to claim 1, further comprising a cable for connecting the driving circuit to the pads, wherein the cable is connected to the pads by a soldering.

11. The backlight unit according to claim 1, wherein the first to Nth pads have substantially the same areas.

12. The backlight unit according to claim 1, wherein the optical member includes a light guide plate at a side of the light emitting diodes, a reflective sheet under the light guide plate and an optical sheet on the light guide plate.

13. A liquid crystal display device module, comprising:
A liquid crystal panel;
A backlight unit for projecting light on the liquid crystal panel, the backlight unit including:
A plurality of light emitting diodes as a light source;
A board having a rectangular shape and including a plurality of metal lines each extending along a first direction, wherein the plurality of light emitting diodes are arranged on the board and respectively connected to the plurality of metal lines;
A pad portion attached to a side, which is parallel to the first direction of the board and including first to Nth pads respectively connected to the plurality of metal lines, wherein N is a positive integer greater than 1;
A driving circuit connected to the first to Nth pads and providing a driving signal into the plurality of light emitting diodes; and
An optical member at a side of the light emitting diodes and for improving a light property,
Wherein the first pad has a larger width and a smaller length than the Nth pad, and
Wherein the width of each of the first to Nth pads is defined as a distance between opposite sides thereof along the first direction, and the length of each of the first to Nth pads is defined as a distance between opposite sides thereof along a second direction perpendicular to the first direction.

14. The liquid crystal display device module according to claim 13, wherein the rectangular shape includes first and second sides along the first direction and third and fourth sides along the second direction, and the pad portion is attached on the first side of the rectangular shape, and wherein the first pad, which is closet to the third side of the rectangular shape, has the largest width and the smallest length, and the Nth pad, which is closet to the fourth side of the rectangular shape, has the smallest width and the largest length.

15. The liquid crystal display device module according to claim 14, wherein widths of the first to Nth pads are stepwise increased, and wherein lengths of the first to Nth pads are stepwise decreased.

16. The liquid crystal display device module according to claim 13, wherein one pad positioned between the first pad and the Nth pad has a width smaller than the first pad and lager than the Nth pad and a length larger than the first pad and smaller than the Nth pad.

17. The liquid crystal display device module according to claim 13, wherein one pad positioned between the first pad and the Nth pad has a width equal to or smaller than the first pad and a length equal to or larger than the first pad, and another one positioned between the first pad and the Nth pad has a width equal to or larger than the Nth pad and a length equal to or smaller than the Nth pad.

18. The liquid crystal display device module according to claim 13, wherein at least one metal line contacts a side, which extends along a second direction perpendicular to the first direction, of corresponding pads.

19. The liquid crystal display device module according to claim 13, further comprising a cable for connecting the driving circuit to the pads, wherein the cable is connected to the pads by a soldering, and wherein the first to Nth pads have substantially the same areas.

20. The liquid crystal display module of claim 13, further comprising a main frame surrounding the liquid crystal panel and a third frame surrounding an edge of the liquid crystal panel.

* * * * *